Jan. 11, 1966 J. E. McATEER 3,229,116

COINCIDENCE GATE EMPLOYING REVERSE BIASED TUNNEL DIODE

Filed May 7, 1962

INVENTOR.
JOSEPH E. McATEER
BY John R. Faulkner
John A. Duffy
ATTORNEYS

United States Patent Office 3,229,116

Patented Jan. 11, 1966

3,229,116

COINCIDENCE GATE EMPLOYING REVERSE BIASED TUNNEL DIODE

Joseph E. McAteer, Anaheim, Calif., assignor to Ford Motor Company, Dearborn, Mich., a corporation of Delaware Filed May 7, 1962, Ser. No. 192,791
3 Claims. (Cl. 307—88.5)

This invention relates to decoders and more particularly to a high speed circuit for converting a digital number stored in binary form at a plurality of input circuits to a signal at one of a plurality of output circuits each indicative of a different decimal number.

Decoding devices are required in most of the present day digital computers and data processing systems. A binary to decimal converter, or decoder, as it is sometimes referred to, converts a digital number which may be stored in a conventional binary counter to a signal output at one of a plurality of output terminals, each representative of a particular decimal number. The output voltage may be utilized in a readout device to directly indicate the decimal number. In addition to the always present requirements of precision, stability, and accuracy, the necessity for high speed capability is more and more becoming critical in the design of digital computers and data processing systems.

Many of the known decoders involve methods of interconnecting resistor and diode circuits in a voltage divider network. A typical decoder may have a diode decode matrix which customarily employs complex circuitry having components which seriously limit the speed of operation. Techniques to improve the output characteristics of prior decode matrix systems (such as diode back biasing) introduce time delays which seriously impede the speed of operation. Accordingly, it is an object of this invention to provide an improved decoder.

The decoder of this invention contemplates as a material feature thereof a binary to decimal converter circuit in which several levels of logic circuits are arranged in a manner to convert a binary number of N digits to a single output voltage in a speedy and efficient manner. Novel coincidence gates which include tunnel diode and transistor switching circuits greatly improve the speed of operation over logical circuits of the prior art.

It is therefore another object of this invention to provide a binary to decimal converter of high speed capability.

It is a further object of the invention to provide a decoder of improved efficiency and reliability.

It is a still further object of the invention to provide a decoder utilizing fast response tunnel diode circuitry to convert a binary number supplied at a plurality of inputs to an output voltage at one of a plurality of outputs.

Other objects of invention may be better understood by reference to the drawings read with the description in which.

According to one aspect of the invention, a decoder is provided in which a storage device has a plurality of output leads in accordance with a multiple digit binary number. A first level of logic is connected to the output leads to receive signals representing the digits and their complements. The first level of logic comprises a plurality of coincidence gates corresponding in number to 8 $N/3$ wherein N corresponds to the digits of the number and provides a plurality of outputs to a second level and subsequent levels of logic. The last level of logic has $2^N$ gates and presents an output voltage at a selected output indicative of the digital number stored in the binary counter.

Greatly improved speed of operation is realized by the use of novel tunnel diode and transistor coincidence gates in the logical circuitry. Additionally, the selected arrangement of logic levels provides a decoder having small current requirements.

Figure 1:
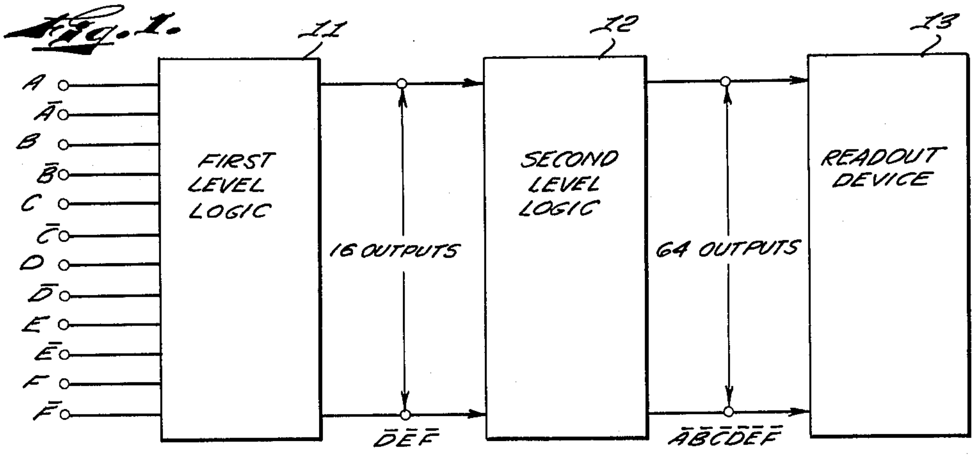
FIG. 1 is a block diagram illustrating the decoder of the invention.

FIG. 1 is a block diagram illustrating the principal aspects of the invention. A first level logic circuit 11 is connected to be responsive to the output of a digital data storage device such as a binary counter (not shown) which has a plurality of flip flops, each of which produces in opposite phase relationship an active condition on one or the other of two output leads, depending on the state of the flip flop. For example, in the embodiment of FIG. 1, an active condition at the terminal A is indicative of the binary 1 state of the flip flop. The first level logic circuit 11 has a plurality of gates equal to 8 $N/3$ wherein N is the number of digits in the binary number to be decoded. Each of the gates of the logic circuit 11 has three inputs and one output. For example, in the embodiment of FIG. 1, it is assumed for explanation purposes that a binary data storage device is storing a digital number of six digits. The first digit, for example, is denoted as the A input terminal for binary 1 and the $\overline{A}$ input terminal for binary 0. Three selected inputs are applied to each of the gates of the first level logic circuit 11 with an output from each gate being fed to the input of a second level logic circuit 12. For example, one of the outputs of the first logic circuit 11 represents the signal ABC, which, when combined with the other 15 outputs of the first level logic circuit 11, serve as the input to a plurality of coincidence gates comprising the second level logic circuit 12.

The second level logic circuit 12 has a plurality of gates corresponding in number to the gates in the first level logic circuit 11 multiplied by four. In the example shown in FIG. 1, wherein the first level logic circuit 11 has 16 gates responsive to the six digit number, the second level logic circuit 12 has 64 gates. Each gate of the second level logic circuit 12 is responsive to a pair of inputs from the output of the first level logic circuit 11 and provides a signal at one of the 64 outputs indicative of the binary number stored. Thus, each of the 64 gates of the second level logic circuit 12 provides an output indicative of a different stored binary number. A readout device 13, which is responsive to the 64 outputs of the second level logic circuit 12, indicates, in decimal form, the binary number stored.

In the embodiment of FIG. 1, the binary number to be decoded has six digits with the first level logic circuit 11 having 16 AND gates. The second level logic which is the last level of logic and has $2^N$ or 64 gates. It is to be realized, of course, that any number of levels of logic may be utilized according to the number of digits in the number to be decoded.

Figures 2, 3:
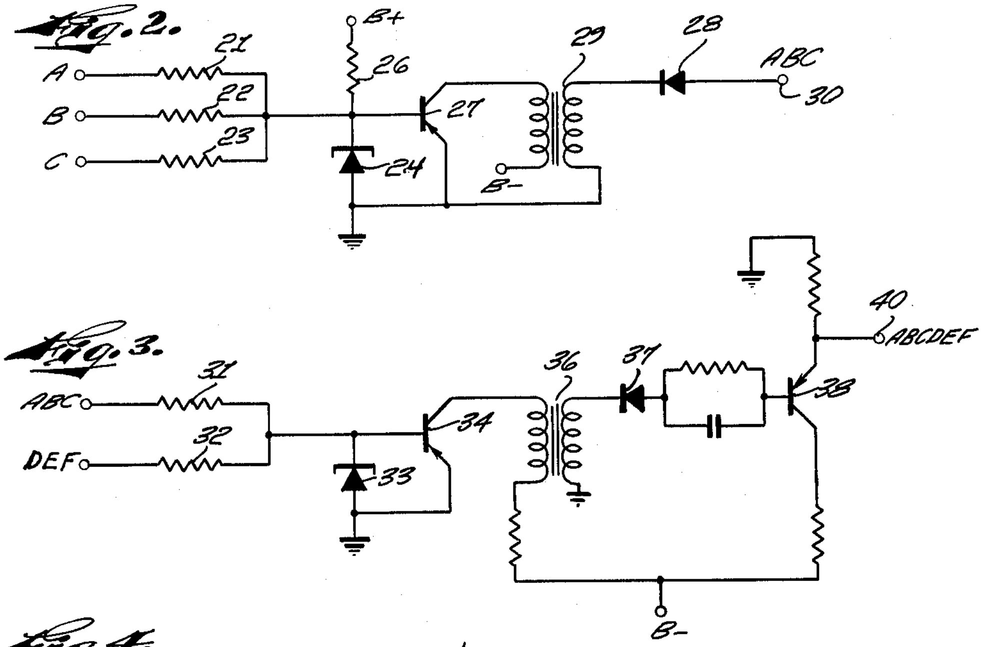
FIG. 2 is a schematic diagram of the preferred embodiment of a coincidence gate used in the first level logic circuit of the decoder of FIG. 1.
FIG. 3 is a schematic diagram of the preferred embodiment of the coincidence gate used in the second and subsequent level logic stages of the decoder.

FIG. 2 is a schematic diagram of the preferred embodiment of a coincidence gate utilized in the first level logic circuit 11 of FIG. 1. In FIG. 2 is illustrated a tunnel diode transistor switching circuit of high speed capability. A resistor network including the resistors 21, 22, and 23 is responsive to three input terminals which are connected to receive three signals representing three digits of the binary number to be decoded. For example, in FIG. 2, the inputs ABC indicative of binary 111 are shown for illustration purposes. The resistors 21, 22, and 23 each have one end connected to the respective terminals A, B, and C, and the other end connected in common to the cathode electrode of a tunnel diode 24. The tunnel diode 24 has its anode connected to ground and its cathode also connected through a resistor 26 to a B+ potential source. The cathode of the tunnel diode 24 is connected to the base electrode of a PNP transistor 27 which has its collector electrode connected through the primary winding of a transformer 29 to a B− potential source. The secondary winding of the transformer 29 has one end connected to ground and the other end connected through a diode 28 to an output terminal 30.

Initially, the tunnel diode 24 is biased by the circuit including the resistor 26 and the B+ potential source to its reverse bias state, thereby maintaining the transistor 27 cutoff so that no output signal will be presented to the output terminal 30. The operation of the circuit of FIG. 2 upon receipt of input signals at the terminals A, B, and C may be best understood when considered in connection with the diagram of FIG. 4 which illustrates a wave form 41 representing the operation characteristics of the tunnel diode 24. The tunnel diode 24 may be operated in a reverse bias state (denoted by the letter *a*), a low current-low voltage state (denoted by the letter *b*), a high current-low voltage state (denoted by *c*), and a high voltage state (denoted by *d*). Initially, the tunnel diode 24 is maintained by the B+ potential source in the reverse bias state *a*. The transistor 27 is cut off and no signal is presented at the output terminal 30. The presence of a negative signal on any one of the inputs A, B, or C lowers the cathode voltage of diode 24, switching the diode to the low current-low voltage state *b*. Since in state *b* the cathode of diode 24 is still at a low negative voltage, the transistor 27 remains cut off. The presence of negative signals on any two of the inputs, such as A and B, switches the tunnel diode 24 from the reverse bias state *a* to the high current-low voltage state *c*, which still does not lower the cathode voltage of diode 24 to a level sufficient to cause the transistor 27 to conduct. The presence of coincidence signals on all of the inputs A, B, and C switches the tunnel diode 24 to state *d*, the high voltage state of the diode. The transistor 27 will be rendered conductive because of the negative cathode voltage on diode 24. Current will flow in the primary of the transformer 29 and a negative voltage will be supplied to the output terminal 30, indicative of an active condition on the terminals ABC. The tunnel diode 24 may typically be of the silicon type with the transistor 27 being a germanium transistor. Since tunnel diode 24 is initially in its reverse bias state, tolerances on input pulses at the terminals A, B, and C are not as severe as they would be if diode 24 were initially forward biased or were not biased at all.

Figure 4:
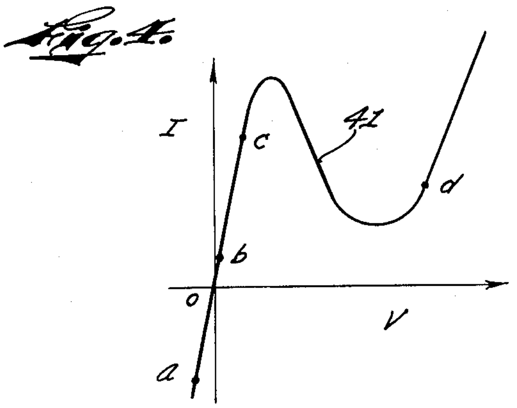
FIG. 4 is a typical wave form of a tunnel diode utilized in the gate circuits of FIGS. 2 and 3.

FIG. 3 is a schematic diagram of a coincidence gate utilized in all subsequent level logics such as second level logic 12 of FIG. 1. FIG. 3 shows a tunnel diode transistor switching circuit in which a tunnel diode 33 has its cathode connected in common through respective resistors 31 and 32 to a pair of input terminals. The input terminals in FIG. 3 may be, for example, ABC and DEF indicative of an active condition on the output leads of the two gates of the first level logic circuit 11 having outputs corresponding to ABC and DEF. A transistor 34 has its base electrode connected to the cathode of the diode 33, its emitter electrode connected to ground, and its collector electrode connected through primary of transistor 36 to a B− potential source. The transistor 34 is normally nonconductive. The secondary of a transformer 36 is coupled through a diode 37 and a resistor capacitor network to the input of a transistor 38 which provides an output signal at a terminal 40 to indicate an active condition on the terminals A, B, C, D, E, and F of FIG. 1. In the switching circuit of FIG. 3, the tunnel diode 33 is not initially reversed biased as in the circuit of FIG. 2, but initially has no bias and is at point 0 as shown in the diagram of FIG. 4. The presence of a signal from either one of the terminals ABC or DEF causes the tunnel diode to switch from state 0 to the high current-low voltage state *c*, which does not provide a sufficiently negative voltage on the cathode of the diode 33 to cause transistor 34 to conduct. The coincidence of signals at the terminals ABC and DEF causes the tunnel diode 33 to switch from state 0 to the high voltage state *d*, causing conduction in the transistor 34 which couples a signal through the transistor 38 to the output terminal 40, indicating coincidence of the input signals to the gate.

The speed of operation of the decoder of the invention is greatly enhanced by the utilization of the tunnel diode circuits as the coincidence gates in the various levels of logic. Additionally, the arrangement of the logic circuits illustrated in FIG. 1 simplifies the circuitry which may be utilized due to the low level of currents required by the gates of the logic levels. In this manner, each output of the levels of logic may be used to feed several inputs of subsequent levels of logic since the current levels are low.

The advantages of the decoder of this invention are readily apparent. Low current levels and high speed of operation are obtained by the arrangement of the logic circuitry and utilization of the particular coincidence gates illustrated.

Although the invention has been described and illustrated in detail, it is to be clearly understood that the same is by way of illustration and example only, and is not to be taken by way of limitation, the spirit and scope of this invention being limited only by the terms of the appended claims.

I claim:

1. A logical coincidence gate comprising,
a tunnel diode having a reverse bias state, a low current-low voltage state, a high current-low voltage state, and a high voltage state,
said tunnel diode connected to be responsive to three logical inputs,
means for biasing said tunnel diode to its reverse bias state in the absence of any signals from said logical inputs,
the presence of a signal from any one of said logical inputs switching said tunnel diode from its reverse bias state to its low current-low voltage state,
the presence of coincidence signals from any two of said logical inputs switching said tunnel diode from its reverse bias state to its high current-low voltage state, and
the presence of coincidence signals from all three of said logical inputs switching said tunnel diode from its reverse bias state to its high voltage state,
and a transistor circuit capable of being biased to conductive and non-conductive states connected to said tunnel diode such that said transistor circuit switches its state in response to said tunnel diode switching to its high voltage state.

2. A logical coincidence gate comprising,
a tunnel diode having a reversed biased state, a low current-low voltage state, a high current-low voltage state, and a high voltage state,
means for connecting a plurality of logical input circuits to said tunnel diode,
said tunnel diode being biased in its reversed bias state in the absence of signals from said input circuits,
the presence of coincidence of signals on all of said plurality of logical input circuits switching said tunnel diode from its reverse biased state to its high voltage state,
the presence of coincidence of signals on less than all of said plurality of logical input circuits being insufficient to switch said tunnel diode to its high voltage state, and means responsive to the high voltage state of said tunnel diode for presenting an output signal indicative of coincidence of signals at said logical input circuits.

3. The combination recited in claim 2 wherein said means for connecting a plurality of logical input circuits to said tunnel diode comprises a resistor network including a plurality of resistors having one end respectively responsive to said logical inputs, and the other end connected in common to the cathode of said tunnel diode.

References Cited by the Examiner

UNITED STATES PATENTS

| | | | |
|---|---|---|---|
| 3,078,376 | 2/1963 | Lewin | 307—88.5 |
| 3,114,846 | 12/1963 | Pressman. | |

OTHER REFERENCES

Pages 4–27 through 4–31, 1957, Notes on Analog-Digital Conversion Techniques, Alfred K. Susskind.

Pages 129–132, 1958, Switching Circuits With Computer Applications, Humphrey, McGraw-Hill Book Co.

MALCOLM A. MORRISON, *Primary Examiner.*